MICROSCOPE ILLUMINATOR FOR LARGE APERTURE AND ILLUMINATION FIELD RANGES

Filed March 31, 1961 7 Sheets-Sheet 1

June 16, 1964 R. CONRADI ET AL 3,137,761

MICROSCOPE ILLUMINATOR FOR LARGE APERTURE AND ILLUMINATION FIELD RANGES

Filed March 31, 1961 7 Sheets-Sheet 3

United States Patent Office 3,137,761
Patented June 16, 1964

3,137,761
MICROSCOPE ILLUMINATOR FOR LARGE APERTURE AND ILLUMINATION FIELD RANGES
Rudolf Conradi, Heidenheim (Brenz), Paul Dopp, Aalen, Wurttemberg, Ewald Habermann, Heidenheim (Brenz), and Gustav Zieher, Aalen, Wurttemberg, Germany, assignors to Carl Zeiss, Heidenheim (Brenz), Wurttemberg, Germany
Filed Mar. 31, 1961, Ser. No. 99,885
Claims priority, application Germany Feb. 26, 1954
4 Claims. (Cl. 88—40)

The invention relates to improvements in a microscope condenser for large aperture and illumination field ranges and is a continuation in part of our application Serial No. 495,025, filed on February 14, 1955, and now abandoned.

In microscopy the alternating use of high and low power objectives requires an alternating illumination in the sense of a passage from high apertures and small illumination fields to small apertures and large illumination fields. A conventional arrangement for attaining this end is for example the unscrewing or swinging aside of the front lens or also of additional lenses of a multi-lens condenser. Thereby it is disadvantageous that after so doing the condenser must be greatly displaced in height, if the illumination field again is to be sharply defined. Unscrewing has the further disadvantage that the condenser must be removed for this purpose. Furthermore, extremely large fields of view are obtained by removal of the entire condenser, whereby then naturally a sharp imaging of the illumination field diaphragm is no longer produced. A further conventional means for producing various aperture and illumination field ranges is the mounting of several condensers on a condenser turret. This conventional arrangement has the disadvantage of being expensive. Furthermore, in case of immersion, a cleaning and an application of oil must take place anew each time. Finally, a variable illumination optical system may be obtained by employing a pancratic system which would have the advantage of a continuous change of the illumination field size. Although with a pancratic system at least three lenses in addition to the customary condenser lens system and an expensive lens shifting mechanism are necessary for producing various aperture and illumination field ranges with one and the same lens arrangement, the application of such pancratic imaging principle with microscope object illumination is justified if particularly high requirements are not to be met with respect to an exact imaging quality. With a pancratic lens system an exact imaging is only available in the two extreme positions of the shiftable lenses and in position of symmetry of the lenses (with equal shiftable lenses), while in all intermediate lens positions an optimum with respect to wide range aperture of the illuminating rays and width of object field illumination adapted to the respective microscope actually in use cannot be obtained.

In accordance with the present invention the optical parts of the condenser proper are fixedly mounted, and for the purpose of obtaining in each case the suitable aperture- and illumination field range additional lenses are provided which are exchangeable in such a manner into and out of the beam of light between the fixed optical parts of the condenser and an illumination field diaphragm that the imaging of the light source in the aperture diaphragm and of the illumination field diaphragm in the object plane is realized. An exchange of the lenses is advantageously effected in that the lenses to be exchanged are arranged for example on at least one eccentrically mounted rotatable disc. In special cases also lens systems to be additionally exchanged may be accommodated in an eccentrically mounted rotatable drum. In this manner various illumination field and aperture ranges may be brought about in optically and mechanically simple and manipulatively convenient manner. With this, above all, the fixed optical parts of the condenser may be of normal construction, i.e. single- or multi-lensed or also deformed, ever in accordance with the aimed at imaging excellence. This lens or lens group can also be adjustable with reference to different slide thicknesses within correspondingly narrow limits. In the simplest case two lenses are required for interposition, since with one accessory lens one is able to increase the illumination field, but without a coarse adjustment an unsharp boundary of the illumination field is produced. The number of gradations of the illumination field range follows on one hand from the structurally determined possibilities of accommodation, and on the other hand is dependent on the size of the total range of the illumination field and of the aperture. For a maximum aperture of about 0.7 and a maximum illumination field of about 8 mm. diameter it is possible to get along with one insertable lens system, but in case of a higher maximum aperture and the same maximum field one better employs two insertable systems. The illumination field and aperture range of the fixed optical parts of the condenser determine the type of the insertable systems.

The drawings illustrate examples of microscope condensers in accordance with the present invention.

Figures 1, 2, 3:
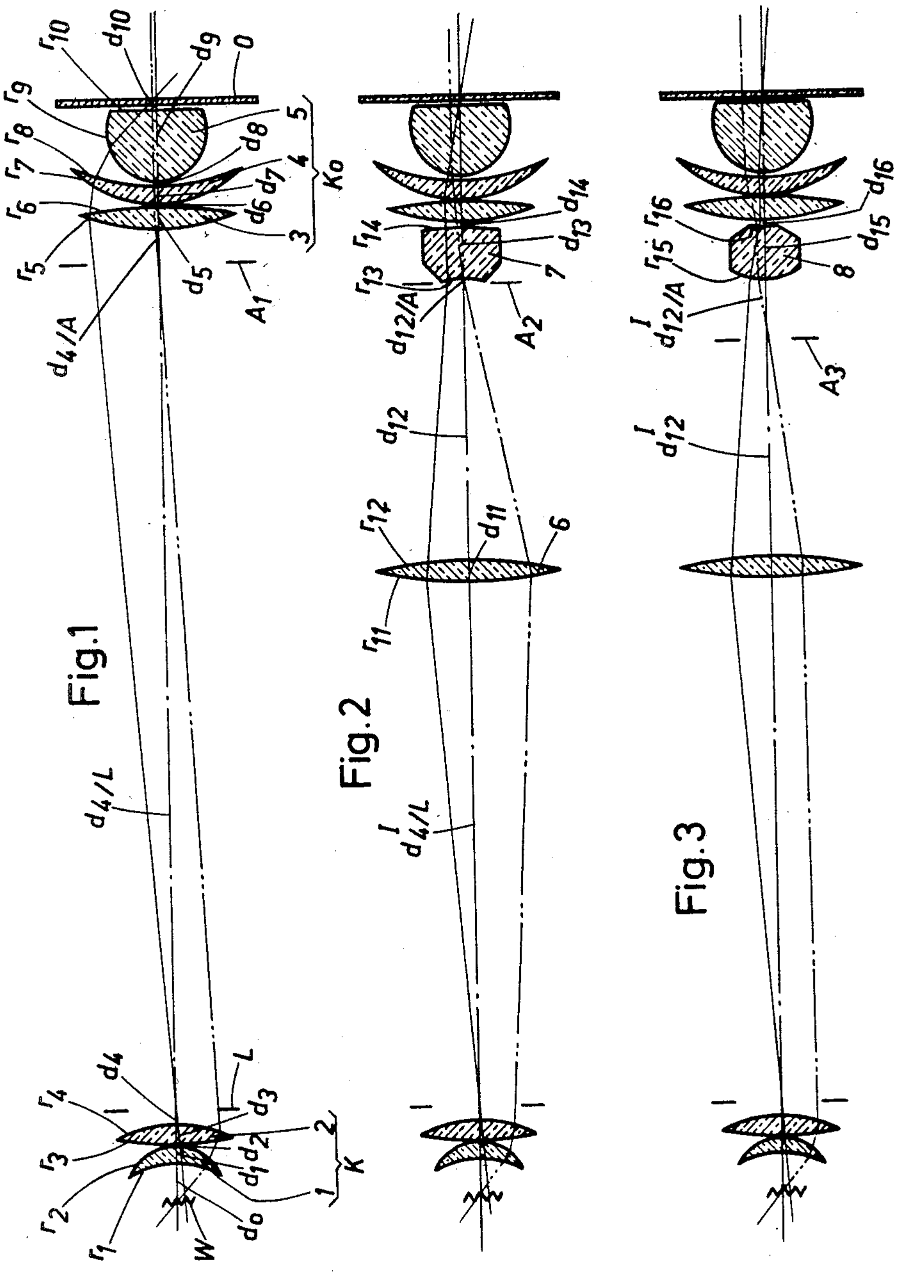
FIG. 1 illustrates a condenser proper with only fixed lenses.
FIG. 2 illustrates a condenser according to FIG. 1 with exchangeable lenses.
FIG. 3 illustrates a condenser according to FIG. 2 with exchanged lenses.

Referring to FIG. 1, the light radiated by a lamp filament W is projected on a slide O, after passing through a collector K with the lenses 1 and 2, an illumination field diaphragm L, and aperture diaphragm $A_1$, and a condenser $K_0$ comprising the lenses 3, 4 and 5. In all of the examples disclosed the slide O is assumed to consist of a plane-parallel plate of 1 mm. (millimeter) thickness and having a refractive index 1.525. The lamp filament W has a uniform diameter of 2 mm. and the illumination field diaphragm L has a diameter of 16 mm.

If one applies the following values to FIG. 1, whereby the distances and thicknesses in each case are expressed in millimeters—

| Lenses and diaphragms | Radii | Axial distances | $n_d$ |
|---|---|---|---|
| W | | $d_0$ =8.0 | |
| 1 | $r_1$ =−15.8<br>$r_2$ =−8.91 | $d_1$ =3.0<br>$d_2$ =0.1 | 1.734 |
| 2 | $r_3$ =+85.4<br>$r_4$ =−21.1 | $d_3$ =3.5<br>$d_4$ =3.0 | 1.734 |
| Field diaphragm L | | $d_{4/L}$=162.8 | |
| Aperture diaphragm $A_1$ | | $d_{4/A}$=7.2 | |
| 3 | $r_5$ =+64.0<br>$r_6$ =−112.0 | $d_5$ =4.0<br>$d_6$ =0.1 | 1.694 |
| 4 | $r_7$ =+22.1<br>$r_8$ =+52.3 | $d_7$ =4.0<br>$d_8$ =0.1 | 1.694 |
| 5 | $r_9$ =+10.6<br>$r_{10}$= ∞ | $d_9$ =15.0<br>$d_{10}$ =0.35 | 1.694 |
| Object slide O (coverglass) | | | 1.518 |

then an aperture of 1.2 and an illumination field 1.1 mm. in diameter is produced, i.e. the condenser alone effects the maximum aperture with a corresponding small illumination field. By a stepwise switching in of an aperture reducing optical system, for example through a system with a positive lens 6 and a negative lens 7, the illumination field can be enlarged step by step (see FIGS. 2 and 3). If in the arrangement of FIG. 2 one selects as a numerical example the following values for the lenses to be interposed:

| Lenses and diaphragms | Radii | Axial distances | $n_d$ |
|---|---|---|---|
| Field diaphragm | | $d^I_{4/L}$ =100 | |
| 6 | $r_{11}$=+66.8<br>$r_{12}$=−66.8 | $d_{11}$ =4.0<br>$d_{12}$ =54.0 | 1.694 |
| Aperture Diaphragm $A_2$ | | $d_{12/A}$=1.0 | |
| 7 | $r_{13}$=−14.3<br>$r_{14}$=−43.4 | $d_{13}$ =10.0<br>$d_{14}$ =1.0 | 1.734 |

then an aperture of 0.32 and an illumination field 4.2 mm. diameter is produced.

If by a further switching one replaces lens 7 by a lens 8 with the values

| | | | |
|---|---|---|---|
| Aperture diaphragm $A_3$ | | $d^I_{12}$ =43.0<br>$d^I_{12/A}$=12.0 | |
| 8 | $r_{15}$=+13.2<br>$r_{16}$=+4.6 | $d_{15}$ =10.0<br>$d_{16}$ =1.0 | 1.734 |

then the illumination field is increased to a diameter of 8.8 mm. and the aperture value drops to 0.15.

Figures 4, 5, 6:
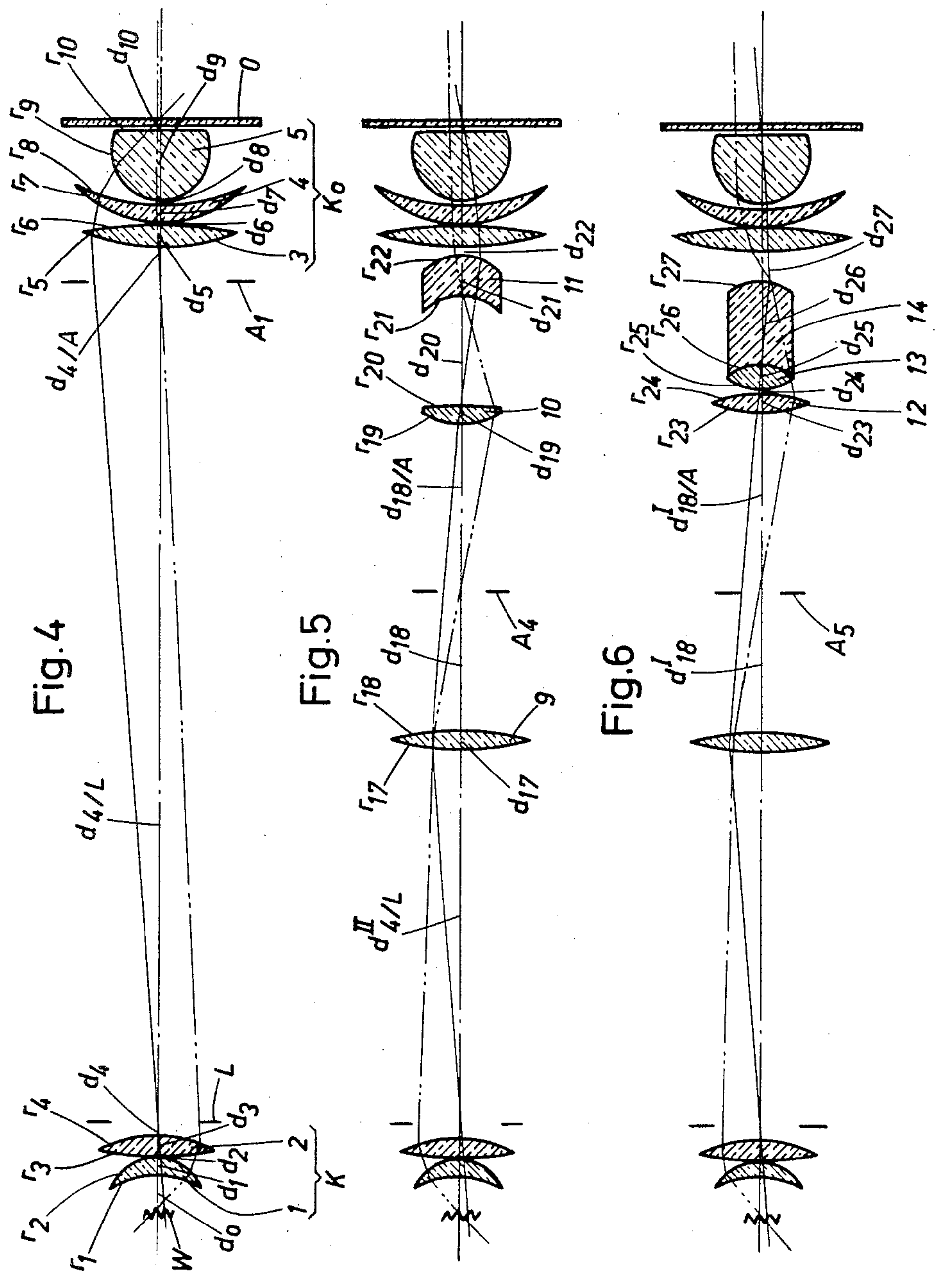
FIG. 4 illustrates a condenser proper similar to FIG. 1.
FIG. 5 illustrates a condenser according to FIG. 4 with supplementarily switched in collective elements in the fashion of a telescope with internal image.
FIG. 6 illustrates a condenser according to FIG. 5 with exchanged, switched in lenses.

Another solution for increasing the illumination field in accordance with the arrangement of FIG. 4 (equal to FIG. 1) consists in that intermediate imaging of the illumination field diaphragm is brought about, whereby the optical system to be interposed consists of several collective elements in the fashion of a telescope with internal image. If one switches into the beam according to FIG. 4 the lenses 9, 10 and 11 (FIG. 5) with the following values:

| Lenses and diaphragms | Radii | Axial distances | $n_d$ |
|---|---|---|---|
| Field diaphragm L | | $d^{II}_{4/L}$ =71.3 | |
| 9 | $r_{17}$=+48.7<br>$r_{18}$=−48.7 | $d_{17}$ =3.7<br>$d_{18}$ =27.0 | 1.694 |
| Aperture diaphragm $A_4$ | | $d_{18/A}$=32.7 | |
| 10 | $r_{19}$=+14.3<br>$r_{20}$=−52.3 | $d_{19}$ =4.0<br>$d_{20}$ =22.0 | 1.694 |
| 11 | $r_{21}$=−10.9<br>$r_{22}$=−10.0 | $d_{21}$ =8.0<br>$d_{22}$ =1.3 | 1.694 |

then the illumination field is increased to 4.0 mm. diameter and the aperture becomes 0.32.

If lenses 10 and 11 are replaced by lenses 12 and 13 as shown in FIG. 6 with the following values:

| Lenses and diaphragms | Radii | Axial distances | $n_d$ |
|---|---|---|---|
| Aperture diaphragm $A_5$ | | $d^I_{18}$ =27.0<br>$d^I_{18/A}$=35.6 | |
| 12 | $r_{23}$=+24.7<br>$r_{24}$=−28.2 | $d_{23}$ =4.0<br>$d_{24}$ =.01 | 1.694 |
| 13 | $r_{25}$=+8.41<br>$r_{26}$=−7.83 | $d_{25}$ =6.0 | 1.554 |
| 14 | $r_{27}$=−9.31 | $d_{26}$ =16.0<br>$d_{27}$ =6.3 | 1.734 |

then the illumination field is increased to 10 mm. diameter and the aperture becomes 0.13.

Figures 7, 8, 9:
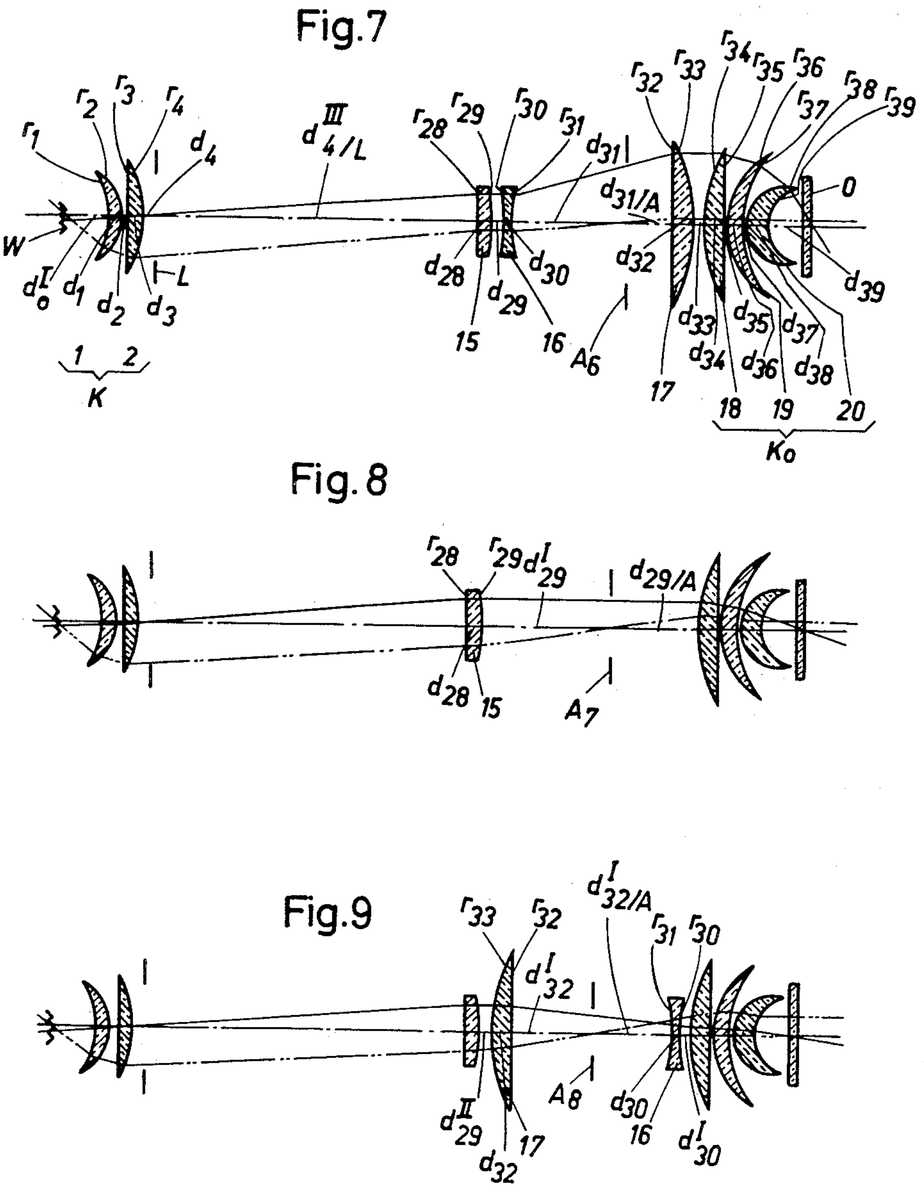
FIG. 7 illustrates a modified form of the condenser proper according to FIG. 4 with supplementarily switched in lenses in the fashion of a Galilean telescope.
FIGS. 8 and 9 illustrate a condenser according to FIG. 7 with exchanged, switched in lenses.

In case of a threefold stepping of the total range it is especially advantageous if one so arranges it that the fixed condenser $K_0$ alone supplies a medium illumination field together with a medium aperture, and then through additional interposition of a system in the fashion of a Galilean telescope in the position with the collective lens facing the collector and the negative lens towards the condenser, the maximum illumination field is attained and in reversed position the maximum aperture. This case is represented in FIGS. 7 to 9. It is advisable to place the illumination field diaphragm in the focal point of an accessory lens 15 and thereby so direct the path of rays that too great angles of incidence on the condenser $K_0$ are avoided. The collector K is the same as shown in FIGS. 1 and 2. The distance $d_0^I$ of the lamp filament W from the lens 1 is equal to 9.4. The following values are at the basis of the system according to FIG. 7 with the fixed condenser lenses 18, 19 and 20 and the interposed lenses 16 and 17 in the fashion of a Galilean telescope with the collective lens towards the condenser:

| Lenses and diaphragms | Radii | Axial distances | $n_d$ |
|---|---|---|---|
| | | $d_0^I=9.4$ | |
| 1 | $r_1=-15.8$ | $d_1=3.0$ | 1.734 |
| | $r_2=-8.91$ | $d_2=0.1$ | |
| 2 | $r_3=+85.4$ | $d_3=3.5$ | 1.734 |
| | $r_4=-21.1$ | $d_4=3.0$ | |
| Field diaphragm L | | $d_{4/L}^{III}=63.8$ | |
| 15 | $r_{28}=\infty$ | $d_{28}=2.5$ | 1.625 |
| | $r_{29}=-41.0$ | $d_{29}=2.5$ | |
| 16 | $r_{30}=-84.1$ | $d_{30}=1.5$ | 1.734 |
| | $r_{31}=+18.6$ | $d_{31}=22.3$ | |
| Aperture diaphragm $A_6$ | | $d_{31/A}=9.6$ | |
| 17 | $r_{32}=\infty$ | $d_{32}=4.0$ | 1.625 |
| | $r_{33}=-34.5$ | $d_{33}=2.5$ | |
| 18 | $r_{34}=+34.5$ | $d_{34}=4.0$ | 1.694 |
| | $r_{35}=\infty$ | $d_{35}=0.1$ | |
| 19 | $r_{36}=+15.4$ | $d_{36}=3.5$ | 1.694 |
| | $r_{37}=+24.8$ | $d_{37}=0.1$ | |
| 20 | $r_{38}=+7.72$ | $d_{38}=4.65$ | 1.625 |
| | $r_{39}=+7.72$ | $d_{39}=7.3$ | |

In this manner the interposed lenses produce a smaller illumination field, namely 1.4 mm. in diameter, and a larger aperture, namely 0.9, than when the lenses 16 and 17 are removed from the system. In this case one obtains a medium aperture of 0.34 and a medium illumination field of 3.7 mm. diameter (FIG. 8):

| | | | |
|---|---|---|---|
| 15 | $r_{28}=\infty$<br>$r_{29}=-41.0$ | $d_{28}=2.5$ | 1.625 |
| Aperture diaphragm $A_7$ | | $d_{29}^I=25.5$<br>$d_{29/A}=16.8$ | |

If in accordance with FIG. 9 the system 16, 17 is inserted reversed in the beam between the accessory lens 15 and the condenser $K_0$ with the distances

| Lenses and diaphragms | Radii | Axial distances | $n_d$ |
|---|---|---|---|
| 15 | $r_{28}=\infty$ | $d_{28}=2.5$ | 1.625 |
| | $r_{29}=-41.0$ | $d_{29}^{II}=2.5$ | |
| 17 | $r_{33}=\infty$ | $d_{32}=4.0$ | 1.734 |
| | $r_{32}=+34.5$ | $d_{32}^I=16.5$ | |
| Aperture diaphragm $A_8$ | | $d_{32}^I/A=15.4$ | |
| 16 | $r_{31}=-18.6$ | $d_{30}=1.5$ | 1.734 |
| | $r_{30}=+84.1$ | $d_{30}^I=2.5$ | |

then there results an aperture of 0.14 and an illumination field 9.0 mm. in diameter.

Figure 10:
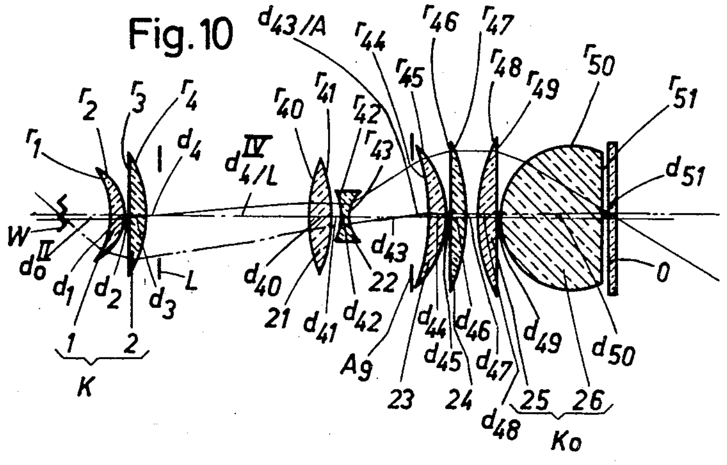
FIG. 10 illustrates a modified form of the condenser proper according to FIG. 4 with supplementarily switched in lenses.
Figure 11:
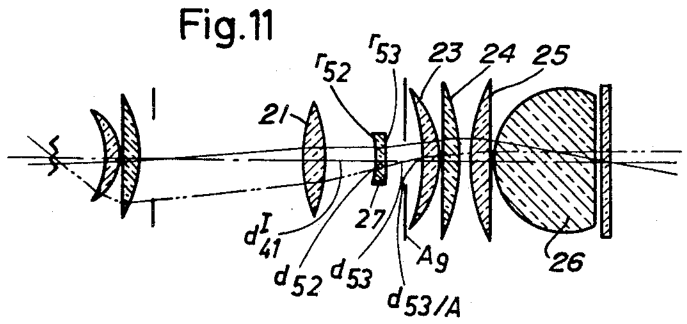
FIGS. 11 and 12 illustrate a condenser according to FIG. 10 with exchanged, switched in lenses.
Figure 12:
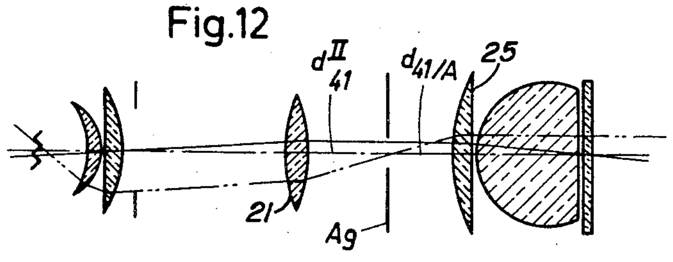

Finally, one can also bring about the production of the maximum illumination field with the fixed condenser $K_0$ and increase the aperture by additionally employing a Galilean telescope with the dispersive part towards the collector and the collective element towards the condenser, if necessary also again in two steps up to the maximum aperture. This third case especially comes into consideration with short overall length in order that then the diameters at the condenser do not become too great in the switching position for the maximum aperture. The FIGS. 10 to 12 show an execution example. The lamp filament W has a distance of 9.5 from the collector lens 1. The arrangement and construction of the collector lenses 1 and 2 are the same as in the previously described examples. An accessory lens 21 is mounted between the condenser lenses 25 and 26 and the collector K. If between this accessory lens 21 and the condenser $K_0$ a system with the lenses 22, 23 and 24 is interposed (FIG. 10) and the following values are applied,

| Lenses and diaphragms | Radii | Axial distances | $n_d$ |
|---|---|---|---|
| | | $d_0^{II}=9.5$ | |
| 1 | $r_1=-15.8$ | $d_1=3.0$ | 1.734 |
| | $r_2=-8.91$ | $d_2=0.1$ | |
| 2 | $r_3=+85.4$ | $d_3=3.5$ | 1.734 |
| | $r_4=-21.1$ | $d_4=3.0$ | |
| Field diaphragm L | | $d_{4/L}^{IV}=30.4$ | |
| 21 | $r_{40}=+34.5$ | $d_{40}=3.5$ | 1.625 |
| | $r_{41}=-34.5$ | $d_{41}=2.2$ | |
| 22 | $r_{42}=-12.0$ | $d_{42}=1.0$ | 1.624 |
| | $r_{43}=+5.66$ | $d_{43}=12.8$ | |
| Aperture diaphragm $A_9$ | | $d_{43/A}=3.4$ | |
| 23 | $r_{44}=-38.1$ | $d_{44}=3.5$ | 1.697 |
| | $r_{45}=-17.8$ | $d_{45}=0.1$ | |
| 24 | $r_{46}=\infty$ | $d_{46}=4.0$ | 1.697 |
| | $r_{47}=-34.5$ | $d_{47}=2.0$ | |
| 25 | $r_{48}=+34.5$ | $d_{48}=4.0$ | 1.697 |
| | $r_{49}=\infty$ | $d_{49}=0.1$ | |
| 26 | $r_{50}=+14.3$ | $d_{50}=21.0$ | 1.697 |
| | $r_{51}=\infty$ | $d_{51}=0.3$ | |

then a maximum aperture of 0.9 and a small illumination field 1.7 mm. in diameter is obtained. This illumination field can be increased if the lens 22 is removed from the beam and in accordance with FIG. 11 a lens 27 with the data

| | | | |
|---|---|---|---|
| 27 | $r_{52}=-9.84$<br>$r_{53}=\infty$ | $d_{41}^I=10.6$<br>$d_{52}=1.0$<br>$d_{53}=4.4$ | 1.734 |
| Aperture diaphragm $A_9$ | | $d_{53/A}=3.4$ | |

is interposed. In this case an aperture of 0.32 and an illumination field 4.0 mm. in diameter is produced.

If, as illustrated in FIG. 12, all supplementary lenses are removed from the beam, then the system supplies the maximum illumination field of 8 mm. diameter with the aperture of 0.16:

| | | | |
|---|---|---|---|
| Aperture diaphragm $A_9$ | | $d_{41}^{II}=16.0$<br>$d_{41/A}=13.0$ | |

Figure 13:
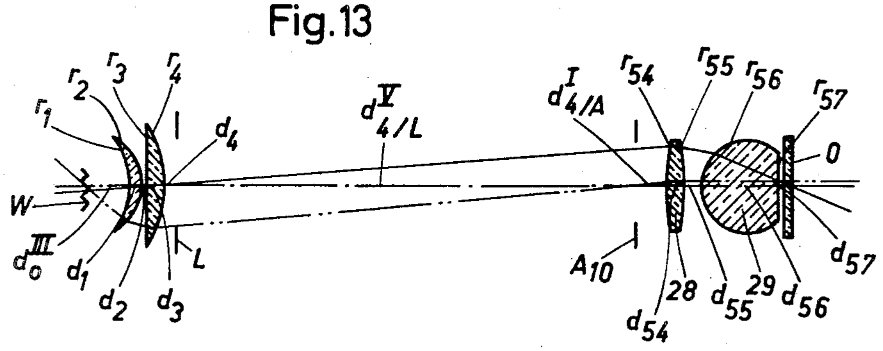
FIG. 13 illustrates a modified form of the condenser proper according to FIG. 4 with a supplementary, switched in lens.
Figure 14:
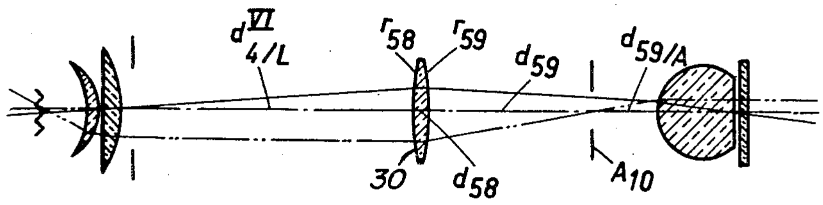
FIGS. 14 and 15 illustrate a condenser according to FIG. 13 with exchanged, switched in lenses.
Figure 15:
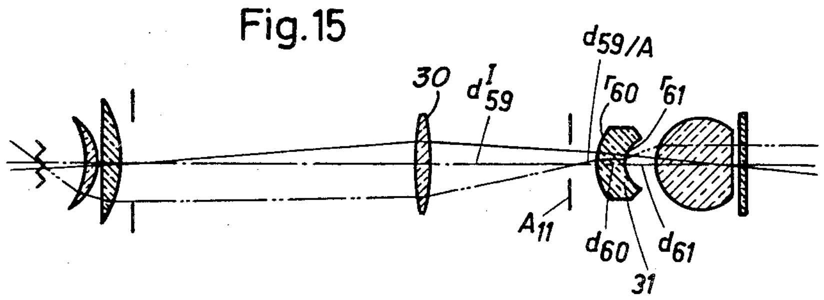

The FIGS. 13 to 15 illustrate the example in which the maximum aperture is produced by the fixed condenser, which consists of a lens 29, in conjunction with an interposed accessory lens 28 in the neighborhood of the condenser, and one arrives at greater illumination fields by switching out this accessory lens 28 and switching in another collective lens 30 of suitable refractive power and in suitable location. The further addition of a negative lens 31 of suitable surface curvature and refractive power in the vicinity of the condenser finally produces the maximum illumination field. In FIG. 13 the following arrangement is made, whereby the lenses 1 and 2 of the collector compared to the previously described examples are the same and the distance of the lamp filament W from the lens 1 is selected at $d_0^{III}=9.0$:

| Lenses and diaphragms | Radii | Axial distances | $n_d$ |
|---|---|---|---|
| Lamp filament | | | |
| | | $d_0^{III}=9.0$ | |
| | $r_1=-15.8$ | | |
| 1 | | $d_1=3.0$ | 1.734 |
| | $r_2=-8.91$ | | |
| | | $d_2=0.1$ | |
| | $r_3=+85.4$ | | |
| 2 | | $d_3=3.5$ | 1.734 |
| | $r_4=-21.1$ | | |
| | | $d_4=3.0$ | |
| Field diaphragm L | | | |
| | | $d_{4/L}^{V}=91.1$ | |
| Aperture diaphragm $A_{10}$ | | | |
| | | $d_{4/A}^{I}=6.1$ | |
| | $r_{54}=+44.0$ | | |
| 28 | | $d_{54}=3.0$ | 1.610 |
| | $r_{55}=-44.0$ | | |
| | | $d_{55}=3.6$ | |
| | $r_{56}=+9.31$ | | |
| 29 | | $d_{56}=15.8$ | |
| | $r_{57}=\infty$ | | |
| | | $d_{57}=0.3$ | |

The result is an aperture of 0.7 and an illumination field 1.9 mm. in diameter. By switching out lens 28 and interposing lens 30 with the data

| | | | |
|---|---|---|---|
| | | $d_{4/L}^{VI}=55.5$ | |
| | $r_{58}=+53.9$ | | |
| 30 | | $d_{58}=3.2$ | 1.792 |
| | $r_{59}=-53.9$ | | |
| | | $d_{59}=32.2$ | |
| Aperture diaphragm $A_{10}$ | | | |
| | | $d_{59/A}=12.9$ | |

an aperture of 0.22 and an enlarged illuminaion field of 6 mm. in diameter is produced. Further interposition of a lens 31 (FIG. 15) with the data

| Lenses and diaphragms | Radii | Axial distances | $n_d$ |
|---|---|---|---|
| | | $d_{59}^{I}=28.0$ | |
| Aperture diaphragm $A_{11}$ | | | |
| | | $d_{59/A}=5.5$ | |
| | $r_{60}=+8.29$ | | |
| 31 | | $d_{60}=6.0$ | 1.734 |
| | $r_{61}=+4.87$ | | |
| | | $d_{61}=5.8$ | |

results in a further enlargement of the illumination field to 8.5 mm. diameter with an aperture of 0.15.

Figure 16:
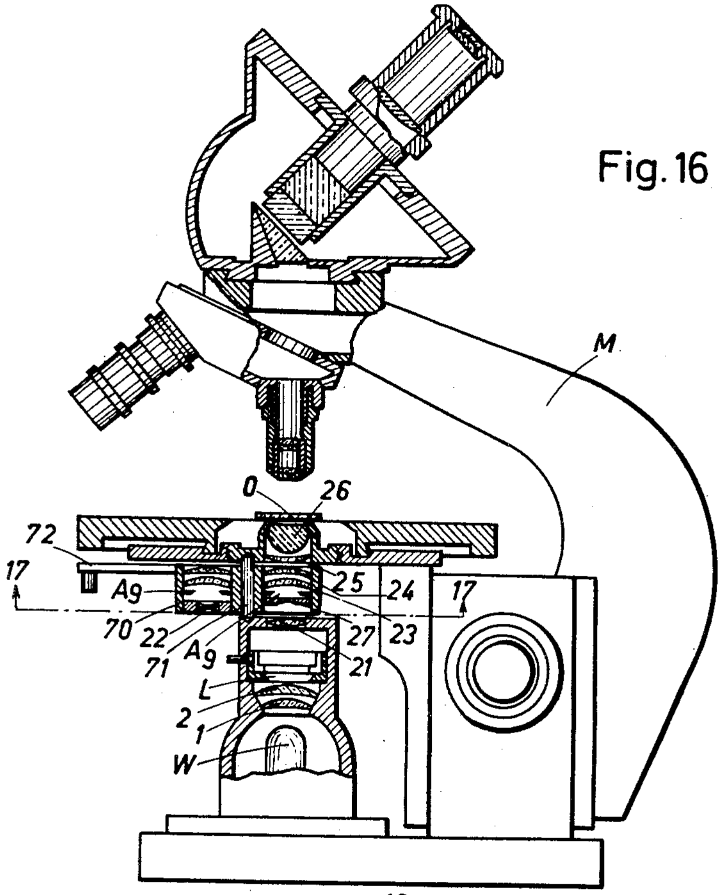
FIG. 16 illustrates an elevation view of a microscope with certain parts in section along the line 16—16 of FIG. 17 and equipped with an illuminating arrangement in accordance with the invention.
Figure 17:
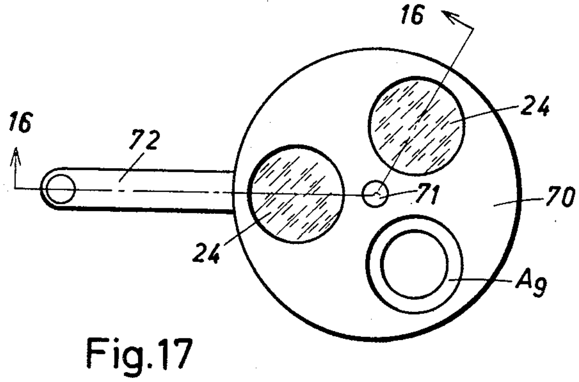
FIG. 17 is a sectional view along the line 17—17 of FIG. 16.

The FIGS. 16 and 17 illustrate a microscope M in which the condenser and the exchangeable lenses 23, 24 of the FIGS. 10, 11 and 12 are incorporated. The rotatable disc 70 is rotatably mounted with or about a vertical shaft 71 supported in the base of the microscope M and has a radially outwardly extending arm 72 for easy manipulation of the disc 70.

Figure 18:
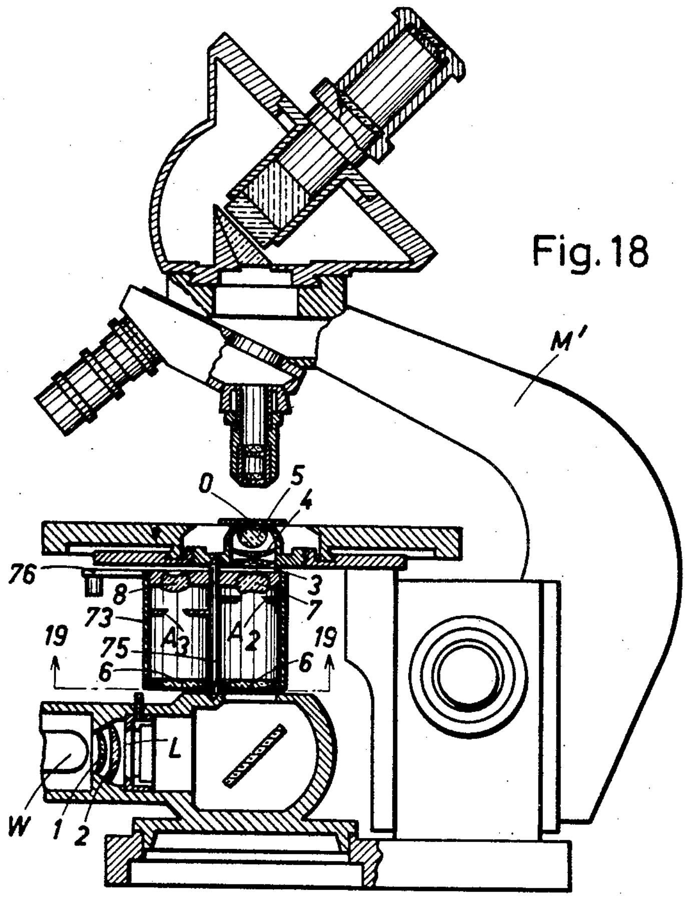
FIG. 18 illustrates an elevation view of a microscope with certain parts in section along the line 18—18 of FIG. 19 and equipped with a modified arrangement of the illuminating arrangement in accordance with the invention.
Figure 19:
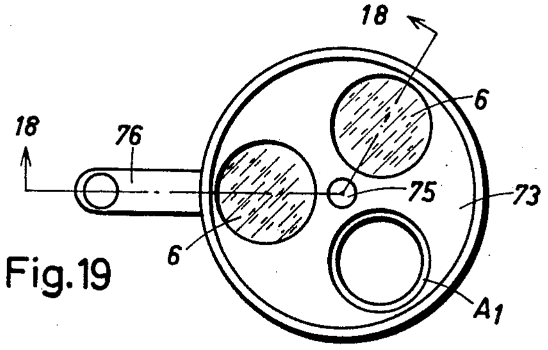
FIG. 19 is a sectional view along the line 19—19 of FIG. 18.

The FIGS. 18 and 19 show a microscope M' of somewhat different construction in which a drum-type carrier 73 for the exchangeable lens pairs 6, 8 and 6, 7 with their associated diaphragms $A_3$ and $A_2$ respectively, as shown in the FIGS. 1, 2 and 3, is rotatably mounted about or with a vertical shaft 75. The drum-type carrier 73 has a radially outwardly extending arm 76 for assisting in the rotative adjustment of the carrier 73 to selectively move any desired lens pair in axial alignment with the condenser lens systems 3, 4 and 5.

What we claim is:

1. A device for illuminating a specimen slide in a miscroscope which alternately uses high and low power objectives, said device being adapted to produce an alternating illumination in the sense of changing from high apertures and small illuminating fields to small apertures and large illuminating fields, and comprising a light source, a fixedly mounted collector lens system arranged adjacent said light source and consisting of two axially aligned lenses, a field diaphragm through which the light coming from said collector lens system passes, said specimen slide being arranged in the path of the light beam passing through said collector lens system and through a fixedly mounted condenser which latter consists of a plurality of axially aligned lenses which are placed one next to the other and directly in front of said specimen slide, at least one of said plurality of lenses consisting of a converging lens, whereby an image of said field diaphragm is projected into the plane of said specimen slide, a removable aperture diaphragm arranged in axially spaced relation from said field diaphragm and between the latter and said condenser, and means for selective insertion into the path of the light beam between said field diaphragm and said condenser for changing the area of the illumination field at said specimen slide, said last mentioned means including a carrier member rotatably mounted about an axis extending parallel to the axis of the light beam, said carrier member carrying a number of groups of lenses, with the lenses in each group arranged in axially spaced relation and with a diaphragm between two lenses in each group, said carrier member also carrying said first mentioned removable aperture diaphragm having a different opening, said lenses and diaphragms carried by said carrier member being adapted to be moved by a rotative adjustment of said carrier member into said path of the light beam and into axial alignment with the same.

2. A device for illuminating a specimen slide in a microscope which alternately uses high and low power objectives, said device being adapted to produce an alternating illumination in the sense of changing from high apertures and small illuminating fields to small apertures and large illuminating fields, and comprising a light source, a fixedly mounted collector lens system arranged adjacent said light source and consisting of two axially aligned lenses, one of which is a concavo-convex lens and is placed next to said light source, while the other is placed next to the convex face of the concavo-convex lens which is directed away from said light source, a field diaphragm through which the light coming from said collector lens system passes, said specimen slide being arranged in the path of the light beam passing through said collector lens system and through a fixedly mounted condenser which latter consists of a plurality of axially aligned lenses which are placed one next to the other and directly in front of said specimen slide, at least one of said plurality of lenses consisting of a converging lens, whereby an image of said field diaphragm being projected into the plane of said specimen slide, a removable aperture diaphragm arranged in axially spaced relation from said field diaphragm and between the latter and said condenser, and means for selective insertion into the path of the light beam between said field diaphragm and said condenser for changing the area of illumination field at said specimen slide, said last mentioned means including a carrier member rotatably mounted about an axis extending parallel to the axis of the light beam, said carrier member carrying two groups of lenses, each group comprising a positive lens and a negative lens axially spaced from each other and with a diaphragm therebetween, said carrier member also carrying said first mentioned removable aperture diaphragm having a different opening, said lenses and diaphragms carried by said carrier member being adapted to be moved by a rotative adjustment of said carrier member into said path of the light beam and into axial alignment with the same.

3. A device for illuminating a specimen slide in a microscope which alternately uses high and low power objectives, said device being adapted to produce an alternating illumination in the sense of changing from high apertures and small illuminating fields to small apertures and large illuminating fields, and comprising a light source, a fixedly mounted collector lens system arranged adjacent said light source and consisting of two axially aligned lenses, a field diaphragm through which the light coming from said collector lens system passes, said specimen slide being arranged in the path of the light beam passing through said collector lens system and through a fixedly mounted condenser which latter consists of a plurality of axially aligned lenses which are placed one next to the other and directly in front of said specimen slide, at least one of said plurality of lenses consisting of a converging lens, whereby an image of said field diaphragm is projected into the plane of said specimen slide, a removable aperture diaphragm arranged in axially spaced relation from said field diaphragm and between the latter and said condenser, and means for selective insertion into the path of the light beam between said field diaphragm and said condenser for changing the area of the illumination field at said specimen slide, said last mentioned means including a carrier member rotatably mounted about an axis extending parallel to the axis of the light beam, said carrier member carrying two groups of lenses, each group comprising a positive lens and a negative lens axially spaced from each other and with a diaphragm therebetween, said carrier member also carrying said first mentioned removable aperture diaphragm having a different opening, said lenses and diaphragms carried by said carrier member being adapted to be moved by a rotative adjustment of said carrier member into said path of the light beam and into axial alignment with the same, said aperture diaphragms being mounted on said carrier member in axially displaced planes.

4. A device for illuminating a specimen slide in a microscope which alternately uses high and low power objectives, said device being adapted to produce an alternating illumination in the sense of changing from high apertures and small illuminating fields to small apertures and large illuminating fields, and comprising a light source, a fixedly mounted collector lens system arranged adjacent said light source and including at least one converging lens, a field diaphragm through which the light coming from said collector lens system passes, said specimen slide being arranged in the path of the light beam passing through said collector lens system and through a fixedly mounted condenser which latter consists of a plurality of axially aligned lenses which are placed one next to the other and directly in front of said specimen slide, at least one of said plurality of lenses consisting of a converging lens, whereby an image of said field diaphragm is projected into the plane of said specimen slide, a removable aperture diaphragm arranged in axially spaced relation from said field diaphragm and between the latter and said condenser, and means for selective insertion into the path of the light beam between said field diaphragm and said condenser for changing the area of the illumination field at said specimen slide, said last mentioned means including a carrier member rotatably mounted about an axis extending parallel to the axis of the light beam, said carrier member carrying two groups of lenses, each group comprising a positive lens and a negative lens axially spaced from each other and with a diaphragm therebetween, said first mentioned removable aperture diaphragm being mounted on said carrier member and having a different opening than said diaphragms between said positive and negative lenses, said lenses and diaphragms carried by said carrier member being adapted to be moved by a rotative adjustment of the carrier member into said path of the light beam and into axial alignment with the same.

References Cited in the file of this patent

UNITED STATES PATENTS

| | | |
|---|---|---|
| 2,078,586 | Richter | Apr. 27, 1937 |
| 2,235,460 | Mestre | Mar. 18, 1941 |
| 2,766,655 | Pinkowski | Oct. 16, 1956 |